United States Patent
Maurer et al.

(10) Patent No.: US 10,436,650 B2
(45) Date of Patent: Oct. 8, 2019

(54) NANOMETER SCALE QUANTUM THERMOMETER

(71) Applicant: President and Fellows of Harvard College, Cambridge, MA (US)

(72) Inventors: Peter Christian Maurer, Boston, MA (US); Hyun Ji Noh, Boston, MA (US); Georg Kucsko, Cambridge, MA (US); Mikhail D. Lukin, Cambridge, MA (US); Hongkun Park, Lexington, MA (US); Minako Kubo, Cambridge, MA (US)

(73) Assignee: President and Fellows of Harvard College, Cambridge, MA (US)

(*) Notice: Subject to any disclaimer, the term of this patent is extended or adjusted under 35 U.S.C. 154(b) by 884 days.

(21) Appl. No.: 14/781,382

(22) PCT Filed: Apr. 1, 2014

(86) PCT No.: PCT/US2014/032511
§ 371 (c)(1),
(2) Date: Sep. 30, 2015

(87) PCT Pub. No.: WO2014/165505
PCT Pub. Date: Oct. 9, 2014

(65) Prior Publication Data
US 2016/0018269 A1    Jan. 21, 2016

Related U.S. Application Data (60) Provisional application No. 61/870,916, filed on Aug. 28, 2013, provisional application No. 61/807,677, filed on Apr. 2, 2013.

(51) Int. Cl.
*G01K 11/20* (2006.01)
*G01K 7/32* (2006.01)
*G01K 13/00* (2006.01)

(52) U.S. Cl.
CPC ............ *G01K 7/32* (2013.01); *G01K 11/20* (2013.01); *G01K 13/00* (2013.01); *G01K 2211/00* (2013.01)

(58) Field of Classification Search
CPC .......... G01K 7/32; G01K 13/00; G01K 11/20; G01K 2211/00
(Continued)

(56) References Cited

U.S. PATENT DOCUMENTS

| | | |
|---|---|---|
| 2009/0034737 A1 | 2/2009 | Trifonov |
| 2011/0062957 A1 | 3/2011 | Fu et al. |
| 2012/0019242 A1 | 1/2012 | Hollenberg et al. |

FOREIGN PATENT DOCUMENTS

| | | |
|---|---|---|
| WO | WO-2012/034924 A1 | 3/2012 |
| WO | WO-2013/040446 A1 | 3/2013 |

(Continued)

OTHER PUBLICATIONS

Toyli et al. "Measurement and Control of Single Nitrogen_Vacancy Center Spin above 600K", arxiv.org, Cornell UNiversity Library, 22 pages, Jan. 21, 2012.*

(Continued)

*Primary Examiner* — Lisa M Caputo
*Assistant Examiner* — Janice M Soto
(74) *Attorney, Agent, or Firm* — Wilmer Cutler Pickering Hale and Dorr LLP (57) ABSTRACT

An approach to nanoscale thermometry that utilizes coherent manipulation of the electronic spin associated with nitrogen-vacancy (NV) color centers in diamond is disclosed. The methods and apparatus allow for detection of temperature variations down to milli-Kelvin resolution, at nanometer length scales. This biologically compatible approach to thermometry offers superior temperature sensitivity and reproducibility with a reduced measurement time. The dis- (Continued)

closed apparatus can be used to study heat-generating intracellular processes.

9 Claims, 5 Drawing Sheets

(58) Field of Classification Search
USPC .................................................. 374/120, 122
See application file for complete search history.

(56) References Cited

FOREIGN PATENT DOCUMENTS

| WO | WO 2013040446 A1 * | 3/2013 | ......... G01R 33/1284 |
|----|--------------------|--------|------------------------|
| WO | WO-2014/210486 A1 | 12/2014 | |

OTHER PUBLICATIONS

Doherty et al., "The nitrogen-vacancy colour centre diamond", Physics Reports, vol. 528, No. 1, pp. 1-45, Mar. 4, 2013.*

Acosta et al., "Temperature dependence of the nitrogen-vacancy magnetic resonance in diamond," arxiv.org, Cornell University Library, 5 pages, Nov. 20, 2009.

Chen et al., "Temperature dependent energy level shifts of nitrogen-vacancy centers in diamond," Applied Physics Letters, vol. 99, No. 16, pp. 161903-1 to 161903-3, Oct. 17, 2011.

Doherty et al., "The nitrogen-vacancy colour centre in diamond," Physics Reports, vol. 528, No. 1, pp. 1-45, Mar. 4, 2013.

European Search Report dated Jan. 10, 2017, in European Application No. 14778267.6, 12 pages.

International Search Report and Written Opinion issued by the International Searching Authority for International Application No. PCT/US2014/032511 dated Aug. 22, 2014 (10 pages).

Kucsko et al., "Nanometre-scale thermometry in living cell," Nature Letter, vol. 500, pp. 54-58+1PP (6 pages), Aug. 2013.

Plakhotnik et al., "Luminescence of nitrogen-vacancy centers in nanodiamonds at temperatures between 300 and 700 K: perspectives on nanothermometry," Physical Chemistry Chemical Physics, vol. 12, No. 33, pp. 9751-9756, Sep. 7, 2010.

Toyli et al., "Measurement and Control of Single Nitrogen-Vacancy Center Spins above 600K," arxiv.org, Cornell University Library, 22 pages, Jan. 21, 2012.

* cited by examiner

NANOMETER SCALE QUANTUM THERMOMETER

RELATED APPLICATIONS

This application is a national stage application of International Application No. PCT/US14/032511, filed Apr. 1, 2014, which claims the benefit of the earlier filing date of U.S. Patent Application No. 61/807,677, filed Apr. 2, 2013, and U.S. Patent Application No. 61/870,916, filed Aug. 28, 2013, all of which are incorporated by reference herein in their entirety.

STATEMENT REGARDING FEDERALLY SPONSORED RESEARCH OR DEVELOPMENT

This invention was made in part with government support under Grant No. HR0011-11-C-0073 awarded by the Defense Advance Research Projects Agency, Grant No. 8DP1DA035083-05 awarded by the National Institutes of Health, Grant No. PHY-1125846 awarded by the National Science Foundation, and Grant No. FA9550-12-1-0024 awarded by the Air Force Office of Scientific Research. The United States government has certain rights in this invention.

INCORPORATION BY REFERENCE

All patents, patent applications and publications cited herein are hereby incorporated by reference in their entirety in order to more fully describe the state of the art as known to those skilled therein as of the date of the invention described herein.

TECHNICAL FIELD

This technology relates generally to high resolution thermometry.

BACKGROUND

Sensitive probing of temperature variations on nanometer scales represents an outstanding challenge in many areas of modern science and technology. A thermometer capable of sub-degree temperature resolution as well as integration within a living system could provide a powerful new tool for many areas of biological research, including the temperature induced control of gene expression, and the cell-selective treatment of disease.

The measurement of temperature on a microscopic length scale has emerged as a common challenge in many areas of science and technology. The ability to monitor sub-kelvin variations over a large range of temperatures can provide insight into both organic and inorganic systems, shedding light on questions ranging from tumor metabolism to heat dissipation in integrated circuits. Moreover, by combining local light-induced heat sources with sensitive nanoscale thermometry, it may be possible to engineer biological processes at the sub-cellular level. Some approaches that are currently being explored for this purpose include scanning probe microscopy, Raman spectroscopy, and fluorescence-based measurements using nanoparticles and organic dyes. These methods, however, are often limited by a combination of low sensitivity, bio-incompatibility, or systematic errors owing to changes in the local chemical environment.

SUMMARY

An approach to nanoscale thermometry that utilizes coherent manipulation of the electronic spin associated with nitrogen-vacancy (NV) color centers in diamond is disclosed. The methods and apparatus allow for detection of temperature variations down to milli-Kelvin resolution, at nanometer length scales. This biologically compatible approach to thermometry offers superior temperature sensitivity and reproducibility with a reduced measurement time. The disclosed apparatus can be used to study heat-generating intracellular metabolic and genetic processes.

In one aspect, a method of measuring temperature includes providing an electron spin system comprising a diamond NV center proximal to a heat source, said diamond NV center having a temperature-dependent zero-field splitting of its ground electronic spin state; applying an optical pulse to polarize the ground electronic spin state; applying a plurality of microwave pulses to alter the spin population of the spin system; applying a series of optical pulses to the spin system and measuring a spin-state-dependent fluorescence rate to detect the spin projection of the electronic ground state of the NV center.

In one or more embodiments, the temperature can be detected at the micro to nanometer scale.

In one or more embodiments, the method further includes analyzing the collected fluorescence to determine the temperature dependent zero-field splitting.

In any of the preceding embodiments, the plurality of microwave pulses includes a $2\pi$-echo-pulse sequence or its equivalent variations.

In any of the preceding embodiments, the microwave pulse is detuned from the zero-field splitting by 0 MHz to 500 MHz of the resonant frequency.

In any of the preceding embodiments, the evolution time is in the range of 0 µs to 10000 µs.

In any of the preceding embodiments, the temperature sensitivity ranges from 10 K/Hz$^{1/2}$ to 50 µK/Hz$^{1/2}$.

In any of the preceding embodiments, the heat source has a temperature between 100K and 600K.

In any of the preceding embodiments, the amount of $^{13}$C impurity in the diamond is 0.0001% to 1.2%.

In one aspect, a method of measuring temperature includes providing electron spin systems comprising a plurality of diamond NV centers proximal to a heat source, each diamond NV center having a temperature-dependent zero-field splitting of its ground electronic spin state; simultaneously applying a continuous microwave pulse and a continuous optical pulse to the spin system to induce a temperature dependent evolution of the electronic spin state; and measuring a spin-state-dependent fluorescence rate to detect the spin projection of the electronic ground state of the NV center.

In any of the preceding embodiments, the method further includes analyzing the collected fluorescence to determine the temperature dependent zero-field splitting.

In any of the preceding embodiments, the microwave energy is detuned from the zero field splitting of the ground state.

In any of the preceding embodiments, the microwave energy is detuned by 10 Hz to 500 MHz of the resonant frequency In any of the preceding embodiments, the temperature sensitivity is in the range from 10 K/Hz$^{1/2}$ to 50 µK/Hz$^{1/2}$.

In any of the preceding embodiments, the plurality of diamond NV centers includes 100-10000 NV centers.

In any of the preceding embodiments, the plurality of diamond NV centers is located within a nanodiamond sensor of 10-5000 nm in size, determining the spatial resolution of the measurement.

In any of the preceding embodiments, the plurality of diamond NV centers maybe located in a liquid environment.

In any of the preceding embodiments, the plurality of diamond NV centers maybe located within a living organism.

In any of the preceding embodiments, the living organism further comprises a nanoparticle.

In another aspect, an apparatus for measuring temperature includes an electron spin system comprising at least one diamond NV center having a temperature-dependent zero-field splitting of the electronic spin state; a first optical source of photons configured to polarize the electronic spin into one spin projection; a microwave source to induce microwave manipulation of the electronic spin state; a second optical source of photons configured to optically induce fluorescence; and a detector configured to measure the spin projection via produced fluorescence to determine the zero-field splitting.

In one or more embodiments, the first and second optical sources are made up of a single laser.

In one or more embodiments, a microwave synthesizer is coupled to an antenna or microwave strip line to drive the electronic spin transition frequency with a microwave field.

In another aspect, a method of measuring the temperature of a living cell includes providing at least one nanodiamond spin system comprising a plurality of diamond NV centers having a temperature-dependent zero-field splitting in its electronic groundstate; introducing at least one spin system into for example a cell; and measuring temperature at the location of the at least one spin system by (i) applying an optical pulse to polarize the electronic spin state; (ii) applying a plurality of microwave pulses to the spin; and (iii) applying a series of optical pulses to the spin and measuring a spin-state-dependent fluorescence rate to detect the population of the spin state of the NV center.

In one or more embodiments, the nanoparticle includes a metal.

In one or more embodiments, introducing includes nanowire-mediated nanoinjection.

In one or more embodiments, the nanodiamond has a dimension in the range of 50-5000 nm in size.

In one or more embodiments, temperature sensitivity ranges from 10 K/Hz$^{1/2}$ to 50 μK/Hz$^{1/2}$.

In one or more embodiments, the cell is a living cell.

BRIEF DESCRIPTION OF THE DRAWINGS

The invention is described with reference to the following figures, which are presented for the purpose of illustration only and are not intended to be limiting. In the Drawings:

FIG. 2A is a plot of measured fluorescence as a function of echo evolution time 2τ (circles), according to one or more embodiments. The black solid line indicates a fit corresponding to a damped cosine function with two distinct frequencies. The characteristic beating can be explained by fluctuating proximal charge traps located at distances of about 50 nm. The inset depicts the microwave 2 π-echo-pulse sequence used to cancel unwanted external magnetic field fluctuations.

DETAILED DESCRIPTION

Figure 1A:
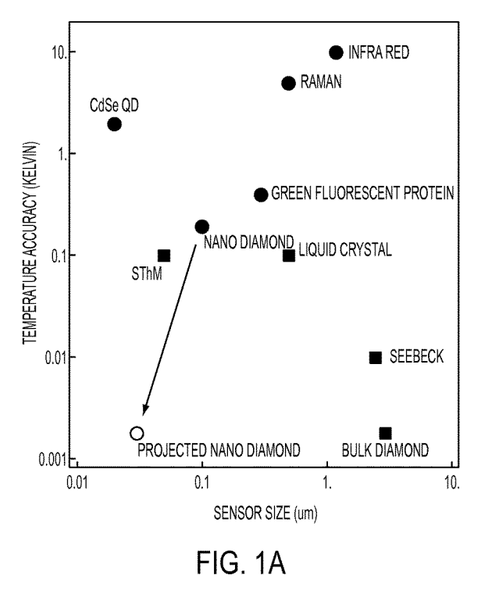
FIG. 1A is a plot showing a comparison between the NV quantum thermometer and other reported techniques as a function of sensor size and temperature accuracy, according to one or more embodiments. Circles indicate methods which are biologically compatible, the open circle indicates ultimately expected accuracy for the measurement technique in solution.

Nanoscale thermometry utilizes the quantum mechanical spin associated with nitrogen vacancy (NV) color centers in diamond. The technique offers biocompatibility and superior temperature sensitivity at nanometer length scales compared to other thermometry techniques, as shown in FIG. 1A. For example, liquid crystal, Seebeck and bulk diamond techniques, although having higher temperature accuracy as compared to Raman, Infrared, and quantum dot techniques, are not biocompatible. Additionally, the sensor sizes of many of these techniques (IR, Seebeck, Bulk diamond) are over 1 micron in scale. The NV approach avoids some drawbacks of these other thermometry techniques, such as drift and artifacts caused by the surrounding chemical environment. For example, Raman spectroscopy and infrared suffer from low sensitivity, fluorescence-based measurements (e.g., nanoparticles, organic dyes, fluorescent polymers) typically have systematic errors due to fluctuations in the fluorescence rate and/or local chemical environment, and green fluorescent proteins are sensitive to optical properties of the surrounding medium and rely on cellular transfection. The calibration and measurement time is also reduced to minutes, as opposed to hours or days as seen with other techniques such as scanning thermal microscopy (SThM).

An NV center or color center is a point defect in the diamond lattice. It consists of a nearest-neighbor pair of a nitrogen atom, which substitutes for a carbon atom, and a lattice vacancy. One property of NV centers is photoluminescence. NV centers emit bright red light which can be conveniently excited by visible light sources.

Figure 1B:
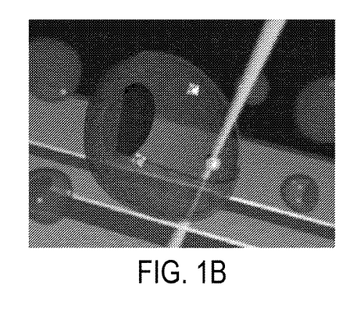
FIG. 1B is a computer rendering of quantum spin-based thermometry using diamond nanocrystals and gold nanocolloids within a living cell, according to one or more embodiments. The controlled application of local heat is achieved via laser illumination of the gold colloids, while nanoscale thermometry is achieved via precision spectroscopy of the NV spin properties.

For some embodiments, detection of temperature variations down to 1.8 mK (sensitivity of 9 mK-Hz$^{-1/2}$) in an ultra-pure bulk diamond sample was demonstrated. By using NV centers in diamond nanocrystals, the local thermal environment at length scales down to 200 nm was demonstrated. As shown schematically in FIG. 1B, in other embodiments, by introducing both nanodiamonds and gold nanoparticles into a single human embryonic fibroblast, temperature-gradient control and mapping at the sub-cellular level was performed, enabling unique potential applications in life sciences such as targeted death of cancer cells. FIG. 1B shows a round cell positioned on a microwave transmission line (shown as light-colored railed under the cell) and containing a darker circular nucleus, two diamond NV centers (shown as faceted, bright objects within the cell), and a gold colloid (small sphere). A laser beam is focused on the gold colloid in order to induce localized heating with plasmonic excitation. The localized heating can be measured by the NV centers and may be used to induce cell death. Other potential applications include the study of temperature-dependence of gene expression and identification of cancer cells with different metabolic rates.

For a sensor containing N color centers, the temperature sensitivity is given by $$\delta T = \frac{C}{d\Delta/dT} \frac{1}{\sqrt{T_{coh} N_T}}, \quad (1)$$

where $T_{coh}$ is the relevant NV spin coherence time and $\tau$ is the integration time. Here, the relationship includes a factor C, to account for imperfect readout and initialization. Assuming $T_{coh}$ on the order of few milliseconds and C≈0.3, a single NV can exhibit a sensitivity better than 100 µK-Hz$^{-1/2}$. Beyond high sensitivity, NV-based thermometry offers several distinct advantages over existing methods in biological and chemical temperature sensing. First, owing to diamond's chemical inertness and biocompatibility, it is generally robust to changes in the local chemical (and cell) environment. Second, the method can be applied over a wide range of temperatures, such as 100-600K.

Figure 1C:
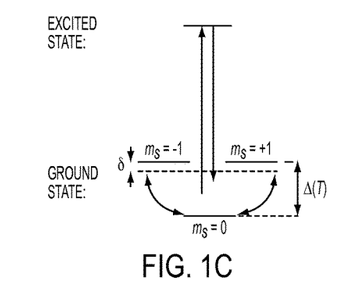
FIG. 1C is a simplified NV level diagram showing a ground state spin triplet and an excited state, according to one or more embodiments. At zero magnetic field the $|\pm1\rangle$ sub-levels are split from the $|0\rangle$ state by a temperature dependent zero field splitting $\Delta(T)$. Pulsed microwave radiation was applied (with detuning δ) to perform Ramsey-type spectroscopy.

The operational principle of NV-based thermometry relies upon the temperature dependent lattice strain of diamond. Changes in the lattice are directly reflected as changes in the spin properties of the NV, which are optically detected with high spatial resolution. As illustrated in FIG. 1C, each NV center constitutes two electrons with a spin-1 degree of freedom with a zero-field splitting Δ between the $|m_s=0\rangle$ and the $|m_s=\pm 1\rangle$ spin projection. "Zero field splitting" is defined as the energy difference of the electronic spin transition frequency between the $m_s=0$ and the $m_s=+/-1$ spin projection. This zero-field splitting exhibits a strong temperature dependence ($d\Delta/dT=-(2\pi)77$ kHz/K at 300K), enabling fluorescence-based thermometry via precision electron spin resonance (ESR) spectroscopy. Spins in NV centers in diamond can be optically "polarized" (or initialized for measurement) to occupy the $|m_s=0\rangle$ state, for example with a 532 nm laser. ESR techniques, using microwaves (MW), can be used to manipulate the spin of the NV center electrons, changing the population of the spin states. Optically induced ("pumped" for example with a 532 nm laser) fluorescence from the NV center can be used to determine ("probe") the population of the spin states. If the population is in the $|m_s=\pm 1\rangle$ state, electrons are optically pumped into a non-radiative state, reducing detected fluorescence. Thus the magnitude of induced fluorescence can be used to determine the projection of the spin state. This combination of polarization, MW manipulation, and probing (described in detail below) can be used in two different techniques to determine the zero-field energy splitting and thus changes in temperature. The first technique is a spin-echo technique, and the second is a continuous wave (CW) technique. Absolute temperatures can also be measured, for example, by determining the intrinsic strain of the diamond at a specific temperature so that the effect of the strain can be accounted for, or by using strain-free diamonds or by measuring on an ensemble of nanodiamonds.

The spin echo technique (or method), provides high temperature sensitivity. A single NV center in a bulk diamond sample is used for the measurement. A long coherence time (100 microseconds) is required for this technique, which can be achieved using a single NV center in a highly pure diamond sample. Coherence time is how long the system is able to measurably maintain a quantum mechanical state, and can be increased, e.g. by increasing crystal quality (e.g. reducing defect density). To accurately determine the temperature, the NV electronic spin can be decoupled from fluctuating external magnetic fields. This is achieved via a modified spin-echo sequence (FIG. 2A inset) that makes use of the spin-1 nature of the NV defect. The spin-echo sequence relies on coherent driving of a two level transition (e.g. ms=0 and ms=+/−1) to achieve periodic population exchange between the two levels called Rabi flopping. This process occurs at a rate called the Rabi frequency. When timing this oscillatory process such that exactly one population exchange between the two levels occurs, such excitation is called a pi-pulse (e.g. the name of the pulse is directed to its duration). Thus, pulse duration is dependent on the Rabi frequency and must be calibrated for each defect center. In some embodiments, the pulses are on the order of around 1-100 ns.

First, the NV center is initialized via optical polarization to the $|m_s=0\rangle$ state. Then, a detuned $\pi/2$ microwave pulse (detuned from the zero-field splitting energy by $\delta$) at frequency $\omega$ is applied (where $\omega=\Delta-\delta$, e.g. the difference between the zero-field splitting energy and the detuning $\delta$ shown in FIG. 1C) to the NV center to create a coherent superposition of spin states, $$\frac{1}{\sqrt{2}}(|0\rangle + |B\rangle),$$

where $$|B\rangle = \frac{1}{\sqrt{2}}(|+1\rangle + |-1\rangle).$$

Figure 2A:
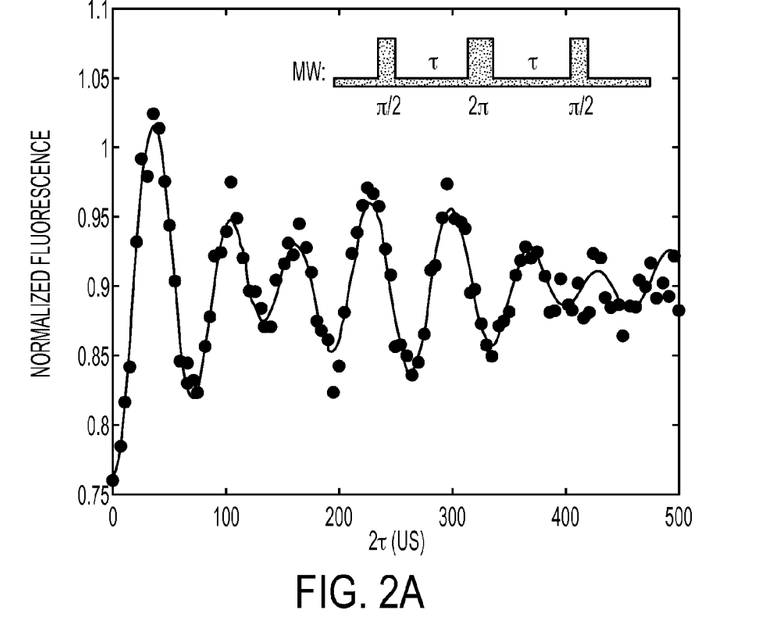

The applied microwave frequency is adjusted to be close to the zero field splitting of the particular defect, for example ~(2\pi)2.87 GHz. Under temperature changes the zero-field splitting be altered and this detuning will change. Thus, the detuning is measured to determine the temperature change. After half the total evolution time, $\tau$, a $2\pi$ echo-pulse is applied that swaps the $|+1\rangle$ and $|-1\rangle$ states. Following another period of $\tau$ evolution, quasi-static (e.g. magnetic-field-induced) shifts of these $|\pm1\rangle$ levels are refocused, allowing for accurate temperature sensing. This modified Ramsey pulse sequence (which consists of two $\pi/2$ pulses separated by a time $2\tau$ and a $2\pi$ pulse after half the evolution time) converts the temperature-dependent detuning $\delta$ into a spin population difference, which can then be measured via fluorescence due to the quantum mechanical structure of the NV center. In some embodiments, the system is probed for 300 ns which was measured to give the maximal signal to noise at the applied laser power. This timescale is determined by the repolarization time of the electron after which no contrast in spin sublevel signal can be observed. If fluorescence is measured for many different pulse sequences of different evolution times $\tau$, an oscillation can be plotted as shown in FIG. 2A (for a single given temperature). $\tau$ is varied to record the full signal, in order to fit a frequency, which in turn determines the change in temperature. The frequency of this oscillation is the detuning between the applied microwave radiation and the temperature determined zero field splitting of the defect. Coherence time is reflected in how quickly the amplitude of the oscillations decays in FIG. 2A. Longer coherence times allow for measurement of a greater number of oscillations, which contributes to measurement accuracy. This can be understood, for example, when considering two signals of similar frequencies. With longer coherence times permitting measurement of a greater number of oscillations, frequency can be determined with greater accuracy and small frequency differences can be observed.

Figure 2B:
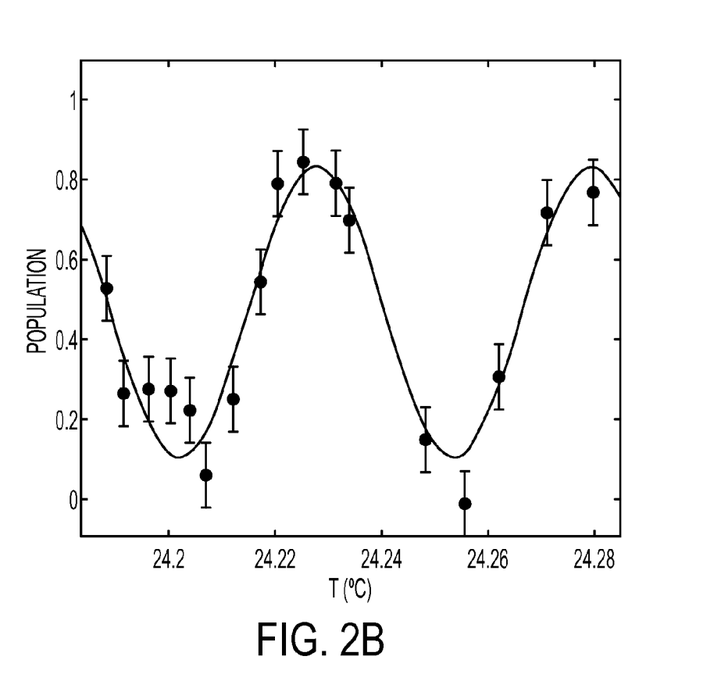
FIG. 2B is a plot measured fluorescence (circles), corresponding error bars (one standard deviation) and a best fit line as function of temperature for an echo time 2τ=250 μs, according to one or more embodiments.

In one embodiment, a CVD-grown, isotopically pure diamond (99.99% spinless $^{12}$C isotope) sample was used to further reduce magnetic field fluctuations originating from the intrinsic $^{13}$C nuclear spin bath. As shown in FIG. 2A, this allows for observation of coherence times approaching 0.5 ms. The coherence time is the timescale with which the amplitude of the flourescence decays, like T in exp(-t/T)]. For the tested NVs, a characteristic low-frequency beating of the fluorescence signal, for example in FIG. 2A as seen in the intermittent loss in contrast around 120 us, was observed that varied from NV to NV center and was most likely due to locally fluctuating charge traps (that generate electrical fields). Despite this beating, a temperature sensitivity of (9±1.8) mK·Hz$^{-1/2}$ was achieved by recording the signal for a fixed evolution time $\tau=250$ µs for a specified temperature range (FIG. 2B). FIG. 2B shows a fluctuation of spin state population as a function of temperature. Thus, measuring fluorescence at a single $2\tau$ suffices as a readout for changes in temperatures, as long as ambiguity is ignored. FIG. 2B shows how even very small temperature changes can quickly be detected. For this figure, the external temperature was controlled via a calibrated Peltier element and read out was done with a thermistor located close to the diamond sample as a reference. Depending on required temperature accuracy, a variable number of measurements can be performed at different evolution times to determine detuning With 30 seconds of integration, a measurement accuracy of 1.8±0.3 mK was achieved.

The second measurement technique (method) allows for high spatial resolution of NV-based thermometry (measurement of temperature change), which can be achieved by using diamond nanocrystals (nanodiamonds) with an ensemble or plurality of NV centers. The term "ensemble" refers to a large number of NV centers that are not individually distinguished during excitation, emission, etc. The use of ensembles allows for higher signal for ease of spatially locating the NV center in a sample. In most commercially available nanodiamonds, the NV coherence time is limited to approximately 1 µs due to additional paramagnetic impurities. While this shortened coherence time reduces the bare temperature sensitivity for a single defect, this decrease can be offset by using an ensemble of NVs to enhance the signal to noise ratio by a factor of $N^{1/2}$ (where N is the number of color NV centers). Proximity to the source (often limited by nanodiamond size) is not critical to the maximum sensitivity in this approach. In fact, the excellent thermal conductivity of diamond ensures that all NV centers within a nanocrystal are in thermal equilibrium with the local heat environment.

In some embodiments, to maximize the number of NV centers and to minimize the diamond lattice strain (which correlated to the zero-field splitting), measurements were performed on single-crystalline nanodiamonds containing approximately 500 NV centers (Adamas Nanotechnologies). The zero-field splitting $\Delta$ of the NV ensemble, and thus the temperature, is determined by recording a continuous-wave ESR spectrum. Thus, microwaves and optical photons are continuously applied to the NV centers. The optical input serves to continuously polarize and probe the spin states of the NV center ensemble. The microwaves are continuously changing spin population.

Figure 3A:
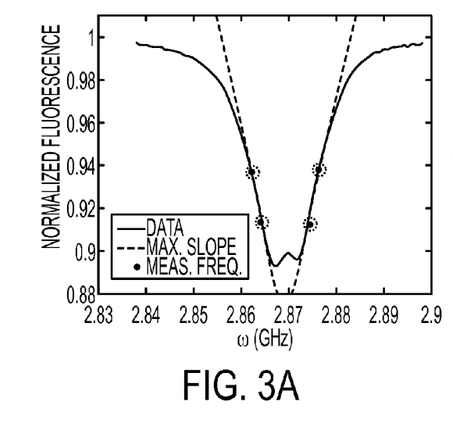
FIG. 3A is a plot of a frequency scan of a single nanodiamond containing approximately 500 NV centers, according to one or more embodiments. The four circled points indicate the measurement frequencies used to determine the temperature of a sample to be measured.

Changes to the zero-field splitting were measure by recording the fluorescence at four different MW frequencies centered around $\Delta=(2\pi)2.87$ GHz (as shown in FIG. 3A). If the applied microwaves are resonant with the zero field splitting, the spins will be pumped into a non-radiative state, reducing fluorescence. Thus, four microwave frequencies detuned from resonance are used to measure the temperature-dependent zero-field splitting. This procedure eliminates unwanted effects from fluctuations in the total fluorescence rate, ESR contrast, Rabi frequency and magnetic field, yielding a robust thermometer (see below for details).

This limited number of measurement points provides accuracy without requiring long measurement times. In some embodiments, calibration or iterative measurements are required for increased accuracy.

Figure 3B:
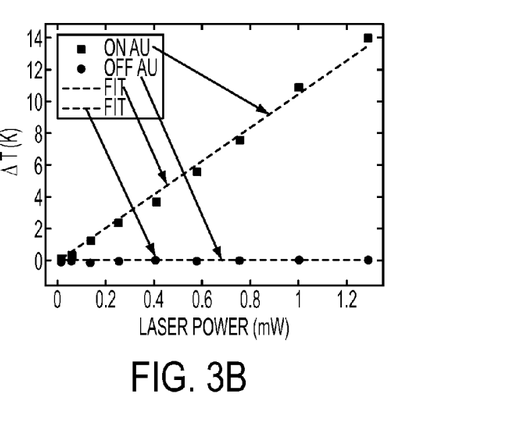
FIG. 3B is a plot of the temperature of a single nanodiamond as a function of laser power for two different laser-focus locations ("on Au" and "off Au"), according to one or more embodiments. One set of points depicts the dramatic heating of a nanodiamond as a result of laser illumination on a nearby gold colloid ("on Au"). The second set of data points depicts the same measurement with the laser focus displaced by 0.8 μm from the colloid location ("off Au"); this results in the negligible heating of the nanodiamond as a function of laser power.
Figure 3C:
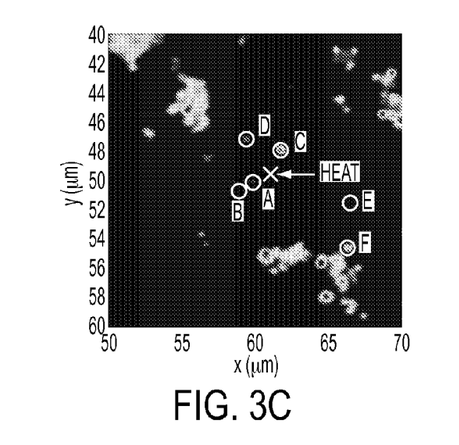
FIG. 3C is a two-dimensional confocal scan of nanodiamonds (circles) and gold colloids (cross) spin-coated onto a glass coverslip, according to one or more embodiments.
Figure 3D:
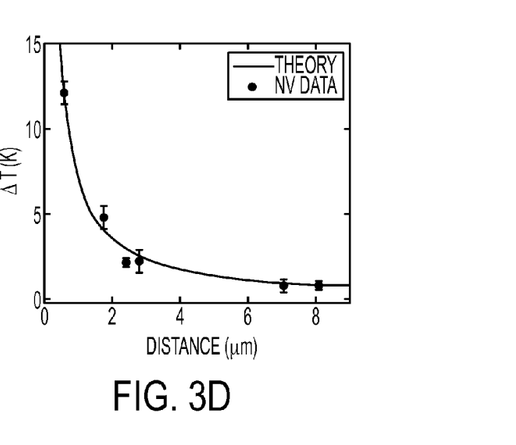
FIG. 3D is a plot of the temperature (circles) at the six nanodiamond locations shown in FIG. 3C, as a function of distance from the illuminated gold colloid (cross in FIG. 3C), according to one or more embodiments. The curve represents the theoretical temperature profile based upon a steady-state solution of the heat equation. All data in this figure are obtained on a glass coverslip and all error bars correspond to one standard deviation.

In some embodiments, coupling the nanodiamond thermometer with the laser heating of a gold nanoparticle (Au NP) allows for both control and monitoring of temperature at nanometer length scales, as shown in FIGS. 3C-3D. In one embodiment, both nanodiamonds and Au NPs (nominal diameter 100 nm) were initially spin-coated on a microscope coverslip. Using a home-built confocal microscope with two independent scanning beams, an Au NP and a nanodiamond that were separated by 0.8±0.1 μm were co-localized. While locally heating the gold colloid via continuous illumination with a variable-power green laser (focused to a diffraction limited spot), the temperature at the nanodiamond location using ESR spectroscopy was simultaneously measured. In one embodiment, a single laser source is used to initialize, pump and probe the NV spin states and to heat the nanoparticle. In another embodiment, different laser sources perform these tasks. Nanoparticles of different size and composition may be used to change their optical resonance and laser heating capability.

FIG. 3B depicts the temperature change recorded by the nanodiamond as a function of the green laser power. The measured temperature change (for "on Au") is in excellent agreement with the theoretically expected temperature profile based upon a steady-state solution of the heat equation, $$\Delta T(r) = \frac{\dot{Q}}{4\pi\kappa r},$$

where $\dot{Q}$ is the neat dissipation, $\kappa$ is the thermal conductivity of glass and r is the distance between the nanodiamond and the Au NP. To further verify that the temperature change originates from the local heating of the Au NP, the measurement was repeated with the excitation laser displaced from the NP by 0.8 μm. In this case, the temperature measured by the nanodiamond remained constant as a function of laser power ("off Au"), thereby confirming the locality of the heat source. As shown in FIG. 3C, the temperature of six nanodiamonds at different distances from the laser-heated Au NP were recorded. The measured temperature profile as a function of distance from the gold nanoparticle (FIG. 3D) was in excellent agreement with the theoretical steady-state prediction (solid line). This allowed for direct estimation of the temperature change at the location of the Au NP to be 72±6 K.

Figure 4A:
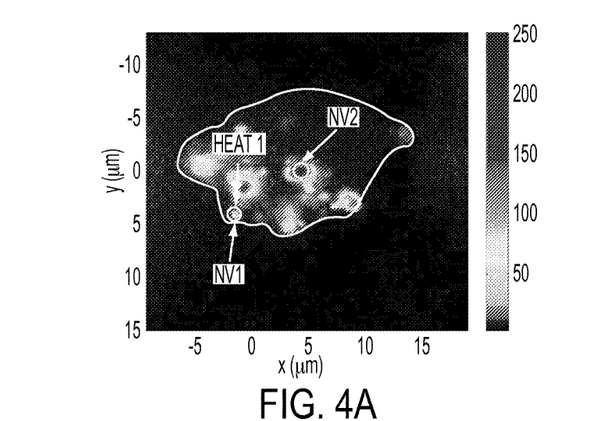
FIG. 4A is a confocal scan of a single cell under 532 nm excitation with collection above 638 nm, according to one or more embodiments. The white cross corresponds to the position of the gold colloid used for heating, while $NV_1$ and $NV_2$ circles represent the location of nanodiamonds used for thermometry. The white line provides a guide to the eye for the outline of the cell membrane.
Figure 4B:
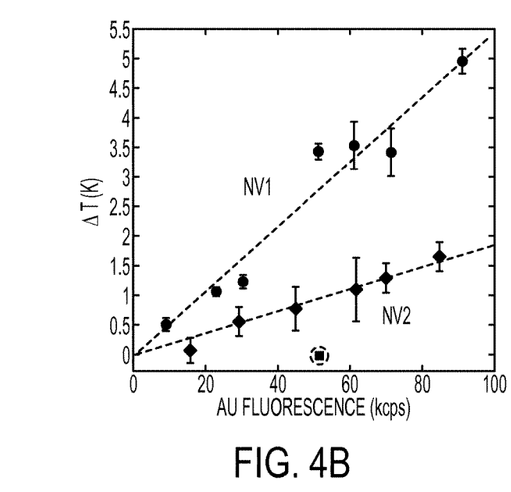
FIG. 4B is a plot of the measured change in temperature at the position of $NV_1$ and $NV_2$ relative to the incident laser power (applied to the colloid), according to one or more embodiments. Dashed lines are linear fits to the data and error bars represent one standard deviation.

To demonstrate that nanodiamond thermometry is fully compatible with living cells, nanodiamonds and Au NPs were introduced into human embryonic fibroblast WS1 cells via nanowire-assisted nano-injection. Using the second measurement technique described above, the temperature was probed at two different nanodiamond locations ($NV_1$ and $NV_2$) within a single cell while locally heating an individual Au NP (FIG. 4A). As shown in FIG. 4B (plot of Au fluorescence in response to changing laser power versus temperature change), $NV_1$, which is significantly closer to the heat source, exhibited a stronger temperature dependence as a function of laser power than $NV_2$. Varying the incident laser power allowed for generation of controlled temperature gradients of up to 5 K over distances of approximately 7 μm. To ensure that this temperature gradient was created by the controlled illumination of the NP and did not result from heating of the cellular cytoplasm, the laser spot was displaced from the Au NP. This displacement resulted in only a negligible temperature change at the location of $NV_1$ with $\Delta T=(-20\pm50)$ mK (circled point in FIG. 4B). Thus, any effect of laser heating of the cellular cytoplasm was minimal. The increased measurement uncertainty for larger laser powers is due to fluctuations of the heating from drift of the Au NP.

The experimental results shown in FIG. 4B clearly demonstrated the sub-micron meter measurement of an intracellular heat gradient. However, the substantial heating induced by constant illumination for an extended period of time, ultimately lead to the death of the cell, which was confirmed using a standard live/dead assay (Calcein AM/Ethidium Homodimer-1).

Figure 4C:
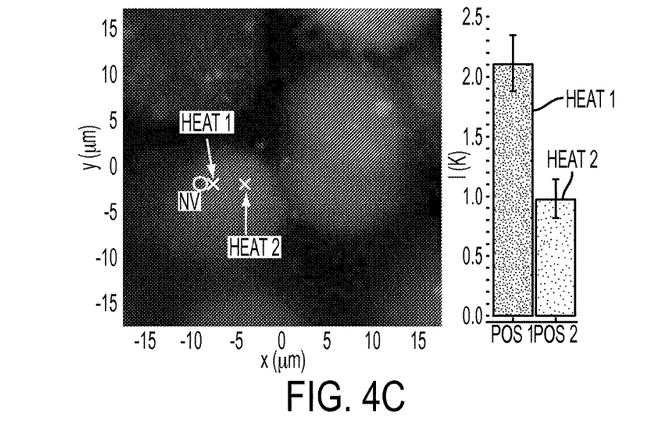
FIG. 4C is a fluorescence scan of stained cells (live/dead assay) with excitation at 494/528 nm and emission at 515 nm (green—cell alive) and 617 nm (red—cell dead), according to one or more embodiments. The bar plot depicts the temperature of a single nanodiamond (white circle in fluorescence scan) with local heat applied at two different locations (Heat 1 and Heat 2 crosses on fluorescence scan).
Figure 4D:
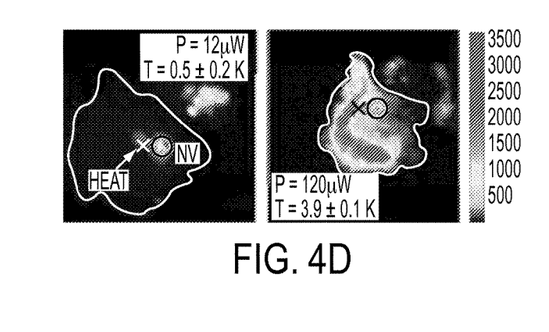
FIG. 4D is a confocal fluorescence scan of an individual cell under varying illumination power, according to one or more embodiments. Excitation occurs at 532 nm and collection is above 630 nm. Cell death is indicated by the penetration of Ethidium Homodimer-1 through the cell membrane, staining the nucleus. At low laser powers, the cell remains alive, while cell-death occurs as laser-induced heating is increased.

To demonstrate that the thermometry technique can be employed within living cells, the concentration of Au NPs was increased in one embodiment, to allow for heat generation at different locations by simply moving the laser focus (e.g. heating an ensemble of gold colloids in FIGS. 4C-4D as opposed to a single gold colloid as shown in FIGS. 4A-4B). The temperature variation was measured at a single nanodiamond (white circle in FIG. 4C) while introducing a slight heating of Au NP ensembles at two differing locations (dark and light crosses and corresponding bar plot in FIG. 4C). After the measurement, the viability of the cell was confirmed (FIG. 4C).

The thermometry method can be used to control cell viability. A cell was heated with 12 μW of laser power and a temperature change of 0.5±0.2K was measured at the nanodiamond location; this measured change corresponded to a change of approximately 10K at the Au NP spot. At this point, the cell's viability was confirmed by the absence of ethidium homodimer-1 fluorescence inside the membrane (FIG. 4D). By increasing the laser power to 120 μW, a temperature change of 3.9±0.1K was induced at the nanodiamond location (approximately 80K at the location of the laser focus); in this case, the cell was flooded with fluorescence from the ethidium homodimer, indicating death. This proof-of-principle experiment indicated that nanodiamond thermometry may help enable the optimization of NP-based photothermal therapies.

The aforementioned experiments demonstrated that the quantum spin of NV centers in diamond can be used as a robust temperature sensor combining the virtues of sub-micron spatial resolution, sub-degree thermal sensitivity and bio-compatibility. The sensitivity of the current measurement can be enhanced by improving the relevant coherence time and by increasing the number of NV centers within the nanocrystal. Optimizing these factors allows for potential sensitivities of 80 μK-$Hz^{-1/2}$, yielding the ability to sense sub-kelvin temperature variations with millisecond time resolution. In solution environments, the ultimate accuracy of these methods will likely be limited by residual heating during the measurement process. As discussed in detail below, this limit is estimated to be in the range of 50 μK to 5 mK, depending on experimental conditions. Furthermore, the spatial resolution of the methods can be improved by using far-field sub-diffraction techniques.

Potential Applications

A number of intriguing potential applications are anticipated. For instance, the simultaneous real-time measurement and control of a sub-cellular thermal gradient could enable the accurate control of gene expression. Another application involves characterizing sub-cellular heat response by observing the expression and localization of GFP-tagged temperature sensitive proteins in response to optically regulated incandescence. The large dynamic range of the quantum thermometer and it's intrinsic robustness may allow for the direct microscopic monitoring and control of chemical reactions. Moreover, combining the above techniques with two-photon microscopy may enable in vivo identification of local tumor activity, by mapping atypical thermogenesis at the single-cell level. Finally the combination of thermoablative therapy with the temperature sensor constitutes a potent tool for the selective identification and killing of malignant cells without damaging surrounding tissue.

It is also contemplated that the above described system can be used to measure changes in electric field strength. Similar to changes in temperature changes in the electric fields affect the NV's zero-field splitting. It is also contemplated that absolute temperature and electric field strength can be determined. Absolute temperature and electric field can be measured, for example, by determining the strain of the diamond so that the effect of the strain can be accounted for, or by using strain-free diamonds or by using ensemble of nanodiamonds.

Nanodiamond Measurement Pulse Sequence

As indicated in FIG. 3A, the fluorescence was recorded at four different frequencies centered around $\Delta = (2\backslash pi)2.87$ GHz:

$$f^{1,2} \approx f(\omega_-) + \frac{\partial f}{\partial \omega}\bigg|_{\omega_-} \left(\mp\delta\omega + \delta B + \delta T \frac{d\Delta}{dT}\right) \text{ and } f^{3,4} \approx f(\omega_+) + \frac{\partial f}{\partial \omega}\bigg|_{\omega_+} \left(\mp\delta\omega - \delta B + \delta T \frac{d\Delta}{dT}\right).$$

This allows for determination of the change in temperature (for small $\delta\omega$), $$\delta T = \frac{\delta\omega}{d\Delta/dT} \frac{(f^1 + f^2) - (f^3 + f^4)}{(f^1 - f^2) + (f^3 - f^4)} \quad (2)$$

where $\omega_\pm \mp \delta\omega$ are the four microwave carrier frequencies and $\delta B$ is a unknown static magnetic field. By averaging the fluorescence at these four frequencies as shown in Eqn (2), errors associated with changes in total fluorescence rate, ESR contrast, Rabi frequency and magnetic field were removed.

Sensitivity

The sensitivity of the methods above is a function of at least the NV coherence time and the number of defect centers. In the above experiments, a sensitivity of 9 mK/$\sqrt{Hz}$ was demonstrated (with a free evolution time of 250 µs). Two natural extensions enable longer NV coherences: 1) decreasing the $^{13}C$ concentration to suppress the nuclear spin bath and 2) further dynamical decoupling. These methods can in principle allow for extension of the evolution time up to $T_1/2 \sim 3$ ms. In combination with a nanocrystal that contains ~1000 NV centers, this could yield a ultimate sensitivity limit as 80 µK/$\sqrt{Hz}$. Further improvement are contemplated, e.g. by employing squeezed states.

Accuracy in Solution

In cases where the above methods are used to probe a system which is in solution (e.g. cells, chemical reactions), heat generation and heat dissipation may affect the measurement process. In particular, the microwave spectroscopy used to detect changes in the NV zero field splitting also induces heating of the solution. A lithographically fabricated microwave loop (diameter 200 µm) was utilized to generate an ac-magnetic field, B≈10 milli-gauss, for spin manipulations. Estimating the effective dipole field created by the microwave loop shows that the solution (water) absorbs $10^{-6}$ W of power, yielding a temperature increase of 5 mK in the steady state. In some embodiments, the system and method are adjusted to reduce heating of the solution by external sources, for example by using a smaller microwave loop (20 µm) and reducing the duty cycle, it is possible to decrease the heating of the solution to approximately 50 µK.

Injection of Nanodiamonds in Cells

In some embodiments, nanodiamonds and Au NPs can be introduced into cells using nanoinjection. In the specific embodiment disclosed herein, nanodiamonds and Au NPs were introduced into WS1 cells via silicon nanowire-mediated nanoinjection. Silicon nanowires were treated with 3-aminopropyltrimethoxysilane to present $NH_2$ functionality on the surface, and nanodiamonds/Au NPs were subsequently attached via electrostatic binding. Afterwards, human embryonic fibroblast WS1 cells were plated on the silicon nanowire substrates and cultured overnight. The cells were removed with trypsin and re-plated on a glass slide with lithographically defined strip lines for ESR measurements. The samples were stained with calcein-AM and ethidium homodimer-1 for the live/dead assay.

Apparatus

Figure 5:
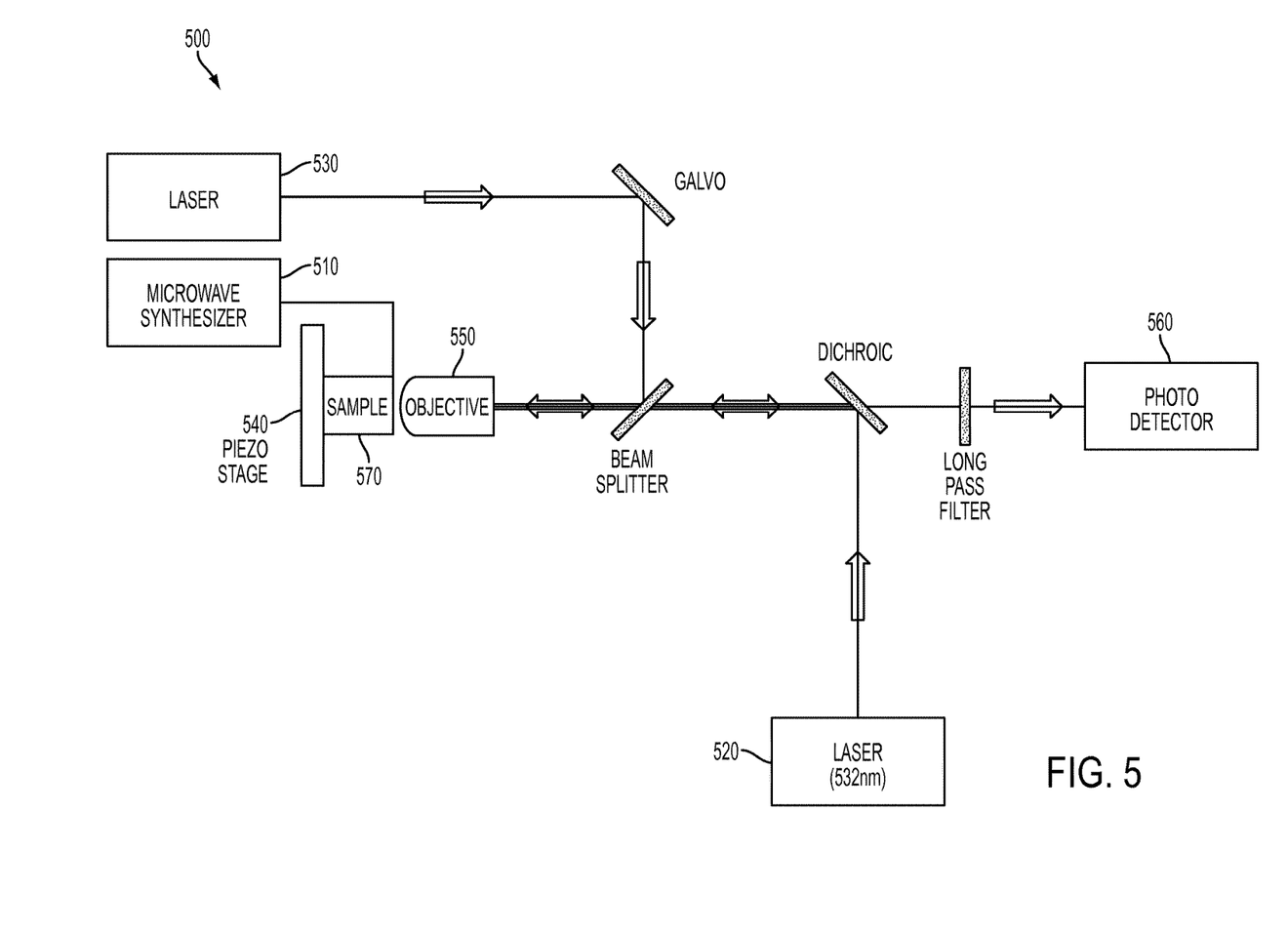
FIG. 5 is a schematic illustration of an apparatus that can be used for temperature sensing, according to one or more embodiments. Arrows show direction of light travel.

As shown in FIG. 5, the thermometry apparatus 500 may include a microwave synthesizer 510 that creates an RF field for ESR manipulation of the electronic spin, two laser sources, one 520 to initialize and readout the electronic spin state of the NV centers and one 530 to laser heat gold colloid(s), a piezoelectric stage 540 for scanning the sample, an optical lens (microscope objective) 550 for focusing light and a photodetector 560 to detect induced fluorescence and to measure the NV's spin state. The apparatus may also include beam splitters, dichroic mirrors, filters, and scanning galvanometers as appropriate for wavelength filtering and laser beam positioning. In some embodiments, the sample to be measured 570 includes diamond particles with NV centers for measuring temperature. The sample may also contain gold colloids for inducing localized heating. In one embodiment, a lithographically fabricated microwave loop (not shown) coupled to the sample 570 is utilized to generate an ac-magnetic field generated by the microwave synthesizer 510 (e.g., the microwave synthesizer generates an AC electrical current which is then transmitted through the loop to create a magnetic field that varies with time at MW frequency) for spin manipulations. The data output of the photo detector 560 can be read out and analyzed in order to perform the measurement techniques described herein.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention. In addition, each and every embodiment can be combined with any other embodiment.

What is claimed is:

1. A method of measuring temperature of a heat source comprising:
    providing an electron spin system comprising a diamond NV center proximal to the heat source, said diamond NV center having a temperature-dependent zero-field splitting of its ground electronic spin state;
    applying an optical pulse to polarize the ground electronic spin state;

applying a plurality of microwave pulses to alter the spin population of the spin system;

applying a series of optical pulses to the spin system;

measuring a spin-state-dependent fluorescence rate to detect the spin projection of the electronic ground state of the NV center; and determining the temperature of the heat source from the spin-state-dependent fluorescence rate.

2. The method of claim 1, wherein the determined temperature is indicative of a temperature at the micro to nanometer scale.

3. The method of claim 1, wherein the plurality of microwave pulses comprises a $2\pi$-echo-pulse sequence or its equivalent variations.

4. The method of claim 1 wherein the microwave pulse is detuned from the zero-field splitting by 0 MHz to 500 MHz of the resonant frequency.

5. The method of claim 1, wherein the evolution time is in the range of 0 μs to 10000 μs.

6. The method of claim 1, wherein the temperature sensitivity ranges from 10 K/Hz$^{1/2}$ to 50 μK/Hz$^{1/2}$.

7. The method of claim 1, wherein the heat source has a temperature between 100K and 600K.

8. The method of claim 1, wherein the amount of $^{13}$C impurity in the diamond is 0.0001% to 1.2%.

9. The method of claim 1, wherein the determining the temperature from the spin-state-dependent fluorescence rate comprises:

determining temperature-dependent zero-field splitting of the NV center; and determining the temperature based on the temperature-dependent zero-field splitting.

\* \* \* \* \*